W. A. WHALEN.
BREAD PAN.
APPLICATION FILED OCT. 6, 1913.
1,105,584.　　　　　　　　　　　　Patented July 28, 1914.
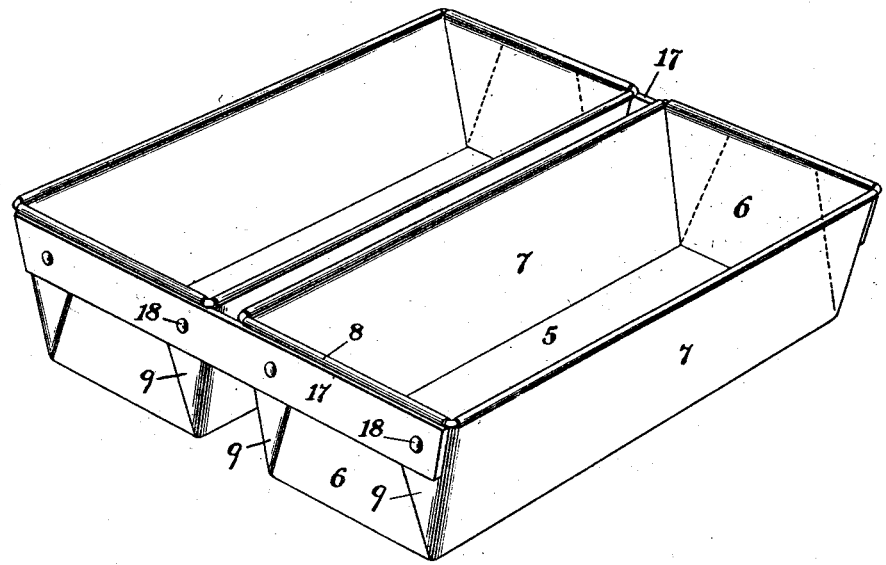
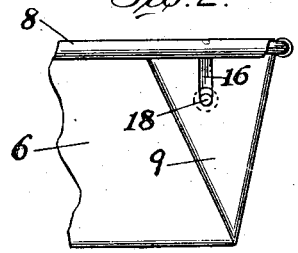
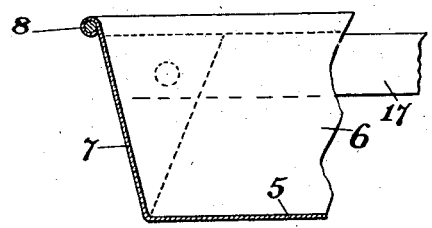
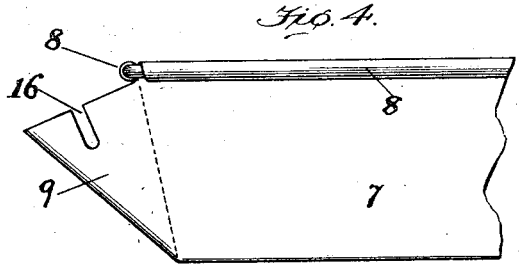
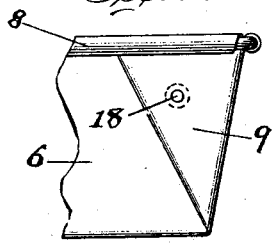
Witnesses　　　　　　　　　　Inventor
　　　　　　　　　　　　　　　Wm. A. Whalen
　　　　　　　　By
　　　　　　　　　　　　　　　Attorneys

UNITED STATES PATENT OFFICE.

WILLIAM A. WHALEN, OF BALTIMORE, MARYLAND, ASSIGNOR OF ONE-HALF TO JOHN A. OSTENDORF, OF BALTIMORE, MARYLAND.

BREAD-PAN.

1,105,584. Specification of Letters Patent. Patented July 28, 1914.

Application filed October 6, 1913. Serial No. 793,531.

*To all whom it may concern:*

Be it known that I, WILLIAM A. WHALEN, a citizen of the United States, residing at Baltimore, in the State of Maryland, have invented certain new and useful Improvements in Bread-Pans, of which the following is a specification.

This invention relates to an improvement in bread pans of that type where a number of small pans form a set, each pan adapted for one individual loaf of bread, have position side by side and are secured together by bars—one bar extending crosswise of one end wall of all the pans, and another bar crosswise of the opposite end wall of all the pans—the bars and end walls being fastened together by rivets. While this type of bread pan is very largely used an objection to it consists in the fact that the rivet heads are exposed at the inner surface of the walls of the pan. These rivet heads are usually steel while the walls of the pan are tin-plate; the steel rivet heads often oxidize and become rough and discolored, and in addition the exposed rivet heads are frequently slightly tilted or not flush with the surface of the pan wall. The rivet heads being exposed at the inside of the pan wall produce marks on the baked loaves of bread that are objectionable.

The object of this invention, therefore, is to provide bread-pans of the type described wherein the rivets used for the purpose named have no exposure inside of the pan.

The invention is illustrated in the accompanying drawing in which—

Figure 1 is a perspective view of a set of pans. Fig. 2 is an outside view of part of the end of a pan showing the rivet openings in the form of a slot. Fig. 3 is a section of part of a pan showing the inner surface of the end. Fig. 4 is a side view of part of a pan with the V-shaped flap turned down. Fig. 5 is an outside view, one corner of pan showing a round rivet-opening in the V-flap.

The pans are rectangular in shape and each pan has a bottom, 5, two end walls, 6, and two side walls, 7, and are usually made of commercial tin-plate; each corner of the pan is formed by producing in the sheet-metal a V-shaped fold, 9, which lies flat against the exterior end-wall, 6; the top-rim of the walls have a bead, 8, that incloses a wire extending all around. It is to be understood that any number of these small pans, say two, three, four or more may compose a set, the several pans included in the set being fastened together by stringer bars, 17, that extend across the exterior surface of the end walls, 6, of all the small pans. The upper edge of the stringer bar is in close contact with and below the beaded top-rim, 8, and the bar is secured to the end wall by rivets, 18, no part of which are exposed inside of the pan.

Rectangular shaped pans have heretofore had at each corner a V-shaped fold, but a novel feature of this invention is the combination with the said "fold" and the stringer bar, of a rivet that passes through the said stringer bar and fold only with the head of the rivet in contact with the exterior surface of the pan-wall. The fold that is made in the sheet-metal blank to form each right-angled corner of the pan, is shown in the drawing; and a hole or opening, 16, is punched or cut through the several thicknesses of this fold; this permits the stem of a rivet, 18, to be inserted with the point-end of the rivet projecting outwardly or away from the pan-wall, and the flat head of the rivets between the fold, 9, and the pan-wall, 6, and contacting with the outer surface of the pan-wall. The stem of the rivet also extends through a hole in the bar, 17, and the point-end of the rivet at the outer surface of the bar is then expanded or flattened down, in the usual manner of "riveting", on the outer surface of the bar. It will be seen no part of the rivet is exposed inside of the pan.

The inventive idea is broad enough to include a fold having a hole or opening of any shape if the head of the rivet is between the fold and the outer surface of the pan-wall.

The form of opening shown in Figs. 2 and 4 is that of a slot, which form is preferred because it compensates for a slight variation in the relative position of the rivet-hole made in the stringer bar, 17.

Having thus described my invention what I claim and desire to secure by Letters Patent is:—

1. A plural number of rectangular shaped individual loaf bread-pans each having at the corners V-shaped exterior folds; a bar extending across two or more of said pans and contacting with said V-shaped folds; and a rivet whose stem extends through the said bar and V-shaped fold and whose head is between the fold and the outer surface of the pan-wall, whereby there is no exposure of rivet at the inner side of the pan.

2. A plural number of rectangular shaped individual loaf bread-pans each having folds that lay against the exterior wall of the pan; a bar extending across two or more of said pans and in contact with said folds; and a rivet through said bar and fold with the head of the rivet concealed between the fold and the outer surface of the pan-wall.

3. A plural number of rectangular shaped individual loaf bread-pans each having at the corners V-shaped exterior folds provided with a slot; a bar extending across two or more of said pans and in contact with said folds; and a rivet through said bar and through the slot in the fold, the head of the rivet being in contact with the exterior surface of the pan-wall.

In testimony whereof I affix my signature in presence of two witnesses.

WILLIAM A. WHALEN.

Witnesses:
CHARLES B. MANN, Jr.,
G. FERD. VOGT.